2 Sheets—Sheet 1.

E. W. ALLEIGH.

Assignor, by mesne assignments, to THE NATIONAL EMBOSSING MACHINE COMPANY.

MACHINE FOR ORNAMENTING WOOD AND OTHER COMPRESSIBLE MATERIAL.

No. 11,133. Reissued Dec. 16, 1890.

WITNESSES:
E. B. Bolton
C. L. Davis

INVENTOR:
Edward W. Alleigh
By Marble, Mann & Mansfield,
his Attorneys.

THE NORRIS PETERS CO., PHOTO-LITHO., WASHINGTON, D. C.

E. W. ALLEIGH.

Assignor, by mesne assignments, to THE NATIONAL EMBOSSING MACHINE COMPANY.

MACHINE FOR ORNAMENTING WOOD AND OTHER COMPRESSIBLE MATERIAL.

No. 11,133. Reissued Dec. 16, 1890.

WITNESSES:

E. B. Bolton

C. L. Davis

INVENTOR:

Edward W. Alleigh

By Marble, Maron & Canfield his Attorneys.

THE NORRIS PETERS CO., PHOTO-LITHO., WASHINGTON, D. C.

UNITED STATES PATENT OFFICE.

EDWARD W. ALLEIGH, OF CHICAGO, ILLINOIS, ASSIGNOR, BY MESNE ASSIGNMENTS, TO THE NATIONAL EMBOSSING MACHINE COMPANY, OF NEW JERSEY.

MACHINE FOR ORNAMENTING WOOD AND OTHER COMPRESSIBLE MATERIAL.

SPECIFICATION forming part of Reissued Letters Patent No. 11,133, dated December 16, 1890.

Original No. 400,625, dated April 2, 1889. Application for reissue filed April 28, 1890. Serial No. 349,835.

*To all whom it may concern:*

Be it known that I, EDWARD W. ALLEIGH, a citizen of the United States, and a resident of Chicago, county of Cook, Illinois, formerly of Minneapolis, county of Hennepin, and State of Minnesota, have invented new and useful Improvements in Machines for Ornamenting Wood and other Compressible Material, of which the following is a specification, reference being had to the annexed drawings, illustrating the invention, in which—

Figure 1:
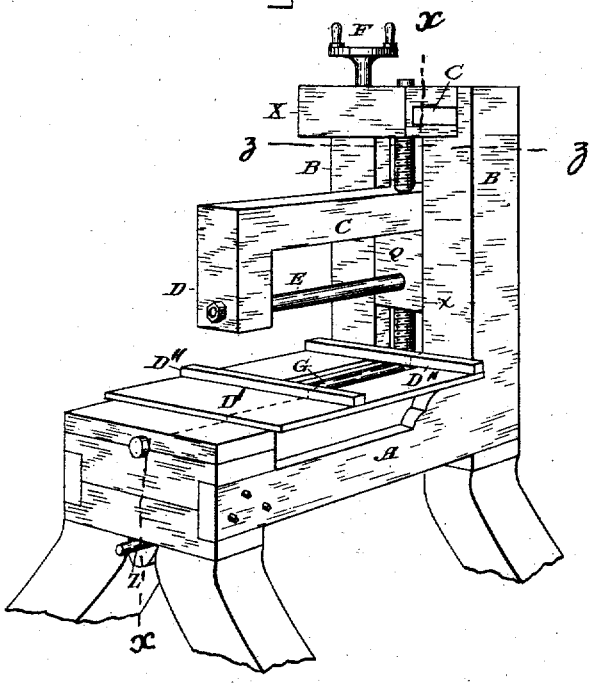
Figure 2:
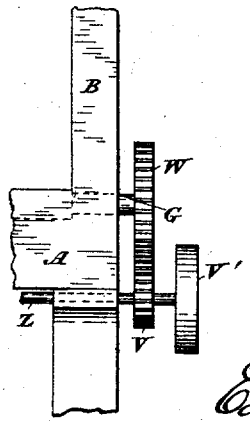
Figure 3:
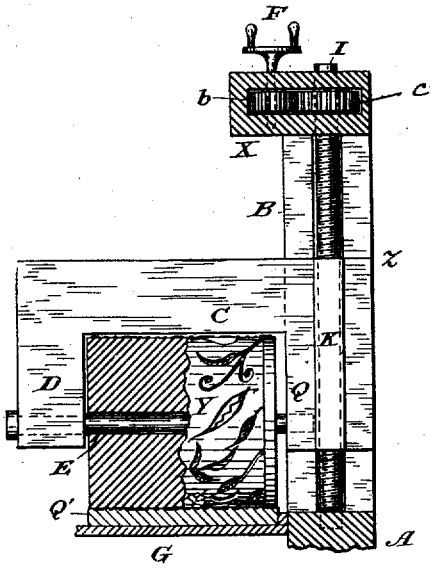
Figure 4:
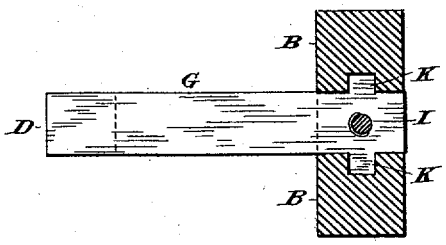

Figure 1, Sheet 1, is a perspective representation of a machine for ornamenting wood, in which is embodied my invention; Fig. 2, an elevation of the rear portion of Fig. 1, showing the gearing; Fig. 3, Sheet 2, a vertical sectional elevation of Fig. 1, or so much thereof as to include its upper portion and a portion of the feed-roller on line *x*, including the die. Fig. 4 is a horizontal section of Fig. 1 on line *z*, looking down.

The purpose of the present invention is to provide better means for imprinting on wood or other compressible material with roller-dies; and its nature will be better understood by reference to the following description.

Referring to the drawings, A A designate the side portion of a strong cast-iron table or support, and B B represent standards, which are preferably cast integral with the side portion A A, and which are provided with a projecting portion X, (more clearly shown in Fig. 3,) to serve as a support and housing for the gearing *b c*. The inner sides of the standards B B are provided with grooves designed to receive the ribs K K, formed on the supporting portion Q of the projecting arm C, which is vertically adjustable on the supports B B. The means by which the arm C is adjusted consist of a screw I, on which is placed a gear-wheel *c* and a gear *b*, pivoted to the projecting portion X, so as to be operated by a lever F. The screw I passes through the supporting portion Q of the arm C, and by operating the lever F the arm C may be adjusted to any desired position, the ribs K, operating in the grooves formed in the standards B B, serving to steady and guide the movements of the arm C. The outer extremity of the arm C is provided with a depending portion D, in which is provided a bearing which supports one end of the shaft E, the other end being supported by a suitable bearing in the opposite portion Q of the arm C, and mounted upon the shaft E is the die Y, which may be provided with any desired configuration for ornamenting wood or other compressible material.

The bed A is provided with a table D′, provided with straps or guides D″, on which the material to be imprinted is placed, the guides D″ serving to retain the material in position as it passes beneath the die, and projecting a little above said table and lying in it is a feed-roller G, Figs. 1 and 3, which carries the material to turn the roller-die to make the imprint.

Any suitable gearing may be employed to drive roller G; but because considerable power is required and accuracy is necessary I employ as most suitable a drive-wheel V′, which is on a shaft Z, extending through the bed A.

On shaft Z is a gear V, which meshes into a gear W, the latter gear being affixed to the same shaft as the feed-roller G, so that when the wheel V′ is driven at the proper speed the material Q′ to be imprinted will be properly fed to the die Y, which at Fig. 3 is partly shown in elevation and partly in section and in position for use.

A machine constructed as herein shown and described has been in practical operation for some months, and it is found that the standards B B, cast solid to the bed A and rigidly secured at their top portions by the support X, in connection with the arm C, provided with the depending guide portion Q and the depending portion D, provide a better support for the shaft E and die Y than machines of any other construction, and that the support X and gearing *b c* therein are very desirable means for regulating the height of the arm C in its adjustment to bring the die Y properly to the wood to be ornamented.

Having fully described my invention, its construction, and operation, what I claim, and desire to secure by Letters Patent, is—

1. In a wood-ornamenting machine, the combination of a table provided at one end with standards B B, a die-supporting arm connected at one end with said standards and vertically adjustable thereon, a die revolubly supported by said arm, a feed-roll revolubly supported below said die, and means for operating said feed-roll, substantially as shown and described.

2. In a wood-ornamenting machine, the combination of a table provided with standards B B at one end thereof, a die-supporting arm having downwardly-projecting portions at each end thereof, connected with said standards and adjustable thereon by means of a screw which passes through one end of said arm, a revoluble die mounted on a shaft having bearings in said downwardly-projecting portions of said arm, a feed-roll mounted in the top of the table below the die, and means for operating the feed-roll, substantially as shown and described.

3. The combination, in a wood-ornamenting machine, of a supporting-table having standards B B at one end thereof, a vertically-adjustable die-supporting arm connected at one end with said standards and having downwardly-projecting portions at each end thereof, a die mounted upon a shaft having bearings in said downwardly-projecting portions, a feed-roll mounted in the top of said table in line with the die-supports, and means for operating said feed-roll, substantially as shown and described.

4. In a wood-ornamenting machine, the combination of the table or support, the standards B B, connected therewith at one end thereof, a die-support provided with downwardly-projecting portions D Q, one of which is adjustably connected with said standards, and a die mounted on a shaft having bearings in the downwardly-projecting portions of the die-support, substantially as shown and described.

5. In a machine for ornamenting wood, the combination of a support provided with standards B at one end thereof, having grooves on their inner sides, the die-support having the depending portions D Q, one of which is provided with ribs K, adapted to enter said grooves, the die mounted on the shaft E, the table, the feed-roll, the top of which extends slightly above the table, and means for operating the feed-roll, substantially as shown and described.

6. In machines for ornamenting wood, the arm C, provided with a depending guide Q, carrying the ribs K K, and the depending portion D, and each depending portion provided with a bearing for the shaft E and the die Y thereon, in combination with the bed A and standards B B at the sides of the guide portion Q, with grooves therein to engage the ribs K, the table D′, and roller G projecting through it, the screw I, gears *b c*, and lever F, as and for the purpose specified.

EDWARD W. ALLEIGH.

Witnesses:

CLARENCE L. DAVIS,

BENJ. HASKELL.